(12) United States Patent
Jung et al.

(10) Patent No.: US 8,380,054 B2
(45) Date of Patent: Feb. 19, 2013

(54) INFORMATION STORAGE MEDIUM WITH STRUCTURE FOR MULTI-ANGLE DATA, AND RECORDING AND REPRODUCING APPARATUS THEREFOR

(75) Inventors: Kil-soo Jung, Gyeonggi-do (KR); Seong-jin Moon, Gyeonggi-do (KR); Jung-wan Ko, Gyeonggi-do (KR); Jung-kwon Heo, Seoul (KR); Sung-wook Park, Seoul (KR); Hyun-kwon Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 807 days.

(21) Appl. No.: 12/354,296

(22) Filed: Jan. 15, 2009

(65) Prior Publication Data
US 2009/0129751 A1    May 21, 2009

Related U.S. Application Data

(62) Division of application No. 10/683,438, filed on Oct. 14, 2003, now Pat. No. 7,860,373.

(60) Provisional application No. 60/452,558, filed on Mar. 7, 2003.

(30) Foreign Application Priority Data

Oct. 14, 2002 (KR) .................................. 2002-62479

(51) Int. Cl.
*H04N 5/917* (2006.01)
*H04N 5/84* (2006.01)

(52) U.S. Cl. ........ 386/329; 386/330; 386/331; 386/332; 386/334; 386/344; 386/350; 386/351; 386/348; 386/326; 386/335

(58) Field of Classification Search .................. 386/348, 386/326, 335, 344, 329–334, 350, 351
See application file for complete search history.

(56) References Cited

U.S. PATENT DOCUMENTS

| | | | |
|---|---|---|---|
| 5,784,528 A | 7/1998 | Yamane et al. | |
| 5,825,727 A | 10/1998 | Han | |
| 6,128,432 A | 10/2000 | Lee | |
| 6,181,872 B1 | 1/2001 | Yamane et al. | |
| 6,393,574 B1 | 5/2002 | Kashiwagi et al. | |
| 6,807,363 B1 * | 10/2004 | Abiko et al. | 386/343 |
| 7,164,845 B2 | 1/2007 | Seo | |
| 7,437,055 B2 | 10/2008 | Hamada | |
| 7,477,833 B2 * | 1/2009 | Kato et al. | 386/241 |
| 7,561,778 B2 * | 7/2009 | Kim et al. | 386/248 |

(Continued)

FOREIGN PATENT DOCUMENTS

| | | |
|---|---|---|
| CN | 1167978 A | 12/1997 |
| CN | 1197572 A | 10/1998 |

(Continued)

OTHER PUBLICATIONS

European Examination Report issued on Jan. 31, 2011, in corresponding European Patent Application No. 04 718 456.9 (7 pages).

(Continued)

*Primary Examiner* — Helen Shibru
(74) *Attorney, Agent, or Firm* — NSIP Law

(57) ABSTRACT

An information storage medium on which multi-angle data is recorded includes at least two clips in each of which video object data for an angle of the multi-angle data is recorded. The at least two clips are recorded in contiguous areas of the information storage medium.

10 Claims, 13 Drawing Sheets

U.S. PATENT DOCUMENTS

| | | | |
|---|---|---|---|
| 7,606,465 B2 | 10/2009 | Seo et al. | |
| 7,672,567 B2* | 3/2010 | Seo et al. | 386/240 |
| 7,693,395 B2* | 4/2010 | Jung et al. | 386/241 |
| 7,702,209 B2* | 4/2010 | Jung et al. | 386/343 |
| 7,764,864 B2* | 7/2010 | Jung et al. | 386/326 |
| 2001/0038745 A1 | 11/2001 | Suhimoto et al. | |
| 2004/0001699 A1 | 1/2004 | Seo et al. | |
| 2004/0165862 A1* | 8/2004 | Jung et al. | 386/69 |
| 2004/0174795 A1 | 9/2004 | Jung et al. | |
| 2004/0179823 A1 | 9/2004 | Jung et al. | |
| 2006/0204216 A1 | 9/2006 | Jung et al. | |
| 2006/0204217 A1 | 9/2006 | Jung et al. | |
| 2006/0204222 A1 | 9/2006 | Jung et al. | |
| 2006/0210252 A1 | 9/2006 | Jung et al. | |
| 2008/0137505 A1* | 6/2008 | Jung et al. | 369/60.01 |
| 2009/0022478 A1* | 1/2009 | Jung et al. | 386/95 |

FOREIGN PATENT DOCUMENTS

| | | |
|---|---|---|
| EP | 1 041 569 | 10/2000 |
| JP | 11-27630 | 1/1999 |
| JP | 11-110950 | 4/1999 |
| JP | 11-355714 | 12/1999 |
| JP | 2000-298918 | 10/2000 |
| JP | 2002-056651 | 2/2002 |
| JP | 2002-083486 | 3/2002 |
| JP | 2002-216460 | 8/2002 |
| JP | 2002-313066 | 10/2002 |
| JP | 2003-101957 | 4/2003 |
| KR | 10-2004-0000290 A | 1/2004 |
| KR | 10-2004-0030992 A | 4/2004 |
| KR | 10-2004-0030994 A | 4/2004 |
| KR | 10-2004-0030995 A | 4/2004 |
| KR | 10-2004-0030996 A | 4/2004 |
| KR | 10-2004-0031009 A | 4/2004 |
| WO | WO 04/001750 | 12/2003 |
| WO | WO 2004/036580 | 4/2004 |

OTHER PUBLICATIONS

U.S. Appl. No. 10/683,438, filed Oct. 14, 2003, Kil-Soo Jung et al., Samsung Electronics Co., Ltd.

U.S. Appl. No. 10/793,955, filed Mar. 8, 2004, Man-seok Kang et al., Samsung Electronics Co., Ltd.

U.S. Appl. No. 10/683,398, filed Oct. 15, 2003, Kil-Soo Jung et al., Samsung Electronics Co., Ltd.

Communication issued by the European Patent Office on Oct. 1, 2007.

Malaysian Search and Substantive Examination for counterpart Malaysian Application No. PI 20033788 issued Mar. 30, 2012 (6 pages, in English).

International Search Report and Written Opinion for counterpart International Application No. PCT/KR2004/000482 issued May 22, 2004 (6 pages, in English).

Chinese Office Action mailed Sep. 12, 2012, issued in counterpart Chinese Patent Application No. 201010180592.1; 5 pages in Chinese language.

European Summons to Attend Oral Proceedings mailed Oct. 29, 2012, issued in counterpart European Patent Application No. 08 165 988.0; 6 pages in English language.

* cited by examiner

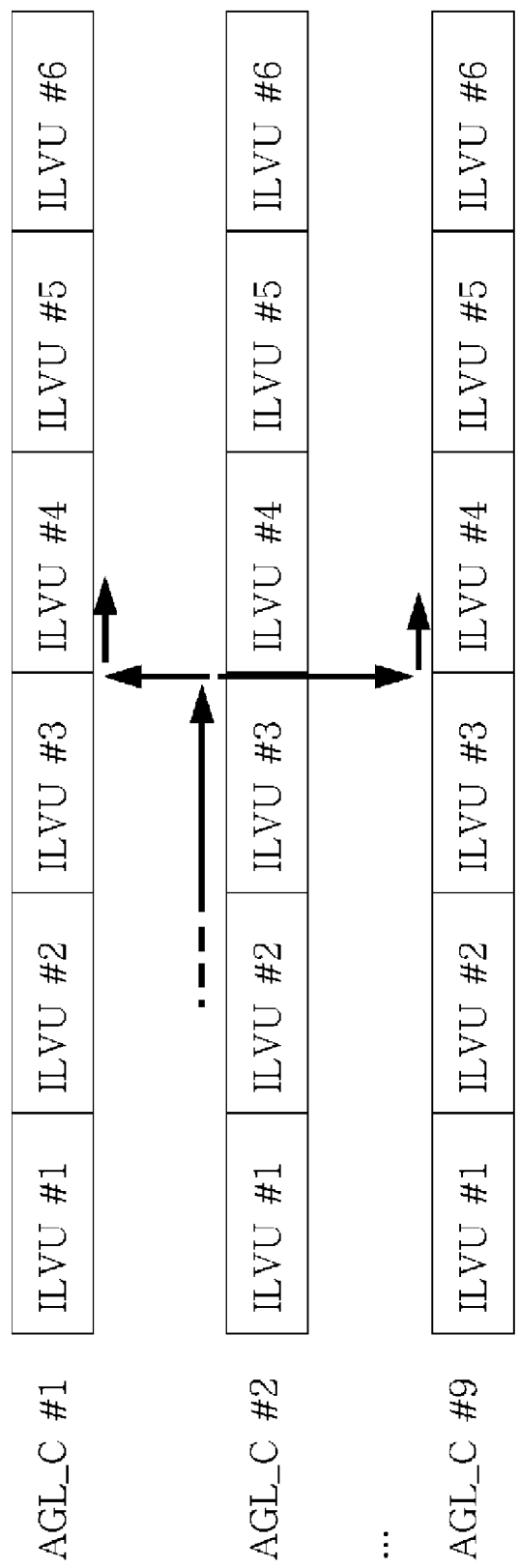

FIG. 12

| SML_AGL_C1_DSTA(Address and size of destination ILVU in AGL_C1) |
| --- |
| SML_AGL_C2_DSTA(Address and size of destination ILVU in AGL_C2) |
| SML_AGL_C3_DSTA(Address and size of destination ILVU in AGL_C3) |
| SML_AGL_C4_DSTA(Address and size of destination ILVU in AGL_C4) |
| SML_AGL_C5_DSTA(Address and size of destination ILVU in AGL_C5) |
| SML_AGL_C6_DSTA(Address and size of destination ILVU in AGL_C6) |
| SML_AGL_C7_DSTA(Address and size of destination ILVU in AGL_C7) |
| SML_AGL_C8_DSTA(Address and size of destination ILVU in AGL_C8) |
| SML_AGL_C9_DSTA(Address and size of destination ILVU in AGL_C9) |

INFORMATION STORAGE MEDIUM WITH STRUCTURE FOR MULTI-ANGLE DATA, AND RECORDING AND REPRODUCING APPARATUS THEREFOR

CROSS-REFERENCE TO RELATED APPLICATIONS

This application is a divisional of U.S. patent application Ser. No. 10/683,438, filed Oct. 14, 2003, now U.S. Pat. No. 7,860,373 currently pending, which claims the benefit of Korean Patent Application No. 2002-62479, filed on Oct. 14, 2002, in the Korean Intellectual Property Office, and U.S. Provisional Application No. 60/452,558, filed on Mar. 7, 2003, in the U.S. Patent & Trademark Office, the disclosures of which are incorporated herein in their entirety by reference.

BACKGROUND OF THE INVENTION

1. Field of the Invention

The present invention relates to an information storage medium with a structure for multi-angle data and recording and reproducing apparatuses therefor.

2. Description of the Related Art

A digital versatile disc (DVD) is a representative example of conventional information storage media on which multi-angle data can be recorded. The multi-angle data is recorded on a DVD using an interleaving method in which data is divided into units and the units are alternately recorded.

Hereinafter, a video data structure of a DVD, which is a conventional multimedia storage medium, will be described with accompanying drawings.

FIG. 1 illustrates a data structure of a DVD. Referring to FIG. 1, a DVD is divided into a video manager (VMG) area and a plurality of video title set (VTS) areas. Information regarding video title(s) and menu information for video titles are stored in the VMG area, and video title data is stored in the plurality of VTS areas. In general, the VMG area includes two or three files and each VTS area includes from three to twelve files.

FIG. 2 illustrates the data structure of a VMG area. Referring to FIG. 2, the VMG area includes a video manager information (VMGI) area containing additional information regarding the VMG area, a video object set (VOBS) area containing video object information regarding title menu, and a VMGI backup area. Each of the VMGI area, the VOBS area, and the VMGI backup area exists as a file. However, the inclusion of the VOBS area in the VMG area is optional. In some cases, the VOBS area may not be formed in the VMG area.

Each VTS area contains title information, which is a unit of reproduction, and video object information VOBS. A plurality of titles may be recorded on a VTS area.

FIG. 3 illustrates a data structure of a VTS area. Referring to FIG. 3, video title set information (VTSI), VOBS for a menu screen, VOBS for a video title set, and VTSI backup data are recorded in the VTS area. Recording of a VOBS is optional for displaying a menu screen. Each VOBS is divided into a plurality of video objects VOBs and cells which are units of record. A VOB includes of a plurality of cells. The most basic unit of record in the present invention is a cell.

In a DVD, units of reproduction are recorded in a hierarchical structure. A title is formed on the uppermost layer of the hierarchical structure. In general, a title is linked to at least one program chain (PGC). The PGC first reproduced, which is one of a plurality of PGCs, is called an entry PGC. FIG. 4 illustrates a title linked to a PGC, i.e., an entry PGC. FIG. 5 illustrates a title linked to a plurality of PGCs. When one of the plurality of PGCs is selected and reproduced after reproduction of a PGC as shown in FIG. 5, the command for determining the PGC to be selected and reproduced may be stored in a DVD. Controlling the sequence of reproduction is navigation. A command for determining navigation is contained in the program chain information (PGCI).

FIG. 6 illustrates a data structure of a PGC. Referring to FIG. 6, the PGC is stored in PGCI which is an information structure. The PGCI contains a pre-command that includes a navigation command, a post-command, and a plurality of program information. The pre-command is executed before reproduction of a PGC and the post-command is executed after reproduction. Each program contains a plurality of cell information. Cells included in a program are linked to respective cells included in a VOB which is a unit of record. Each cell, i.e., a unit of reproduction, has a cell command that is provided after reproduction thereof. The PGCI is a hierarchical description of the PGC, i.e., the unit of reproduction, and has an information structure that links a cell, which is the most basic unit of reproduction, to a cell which is the most basic unit of record.

In particular, the PGC is a link of a plurality of cells which are units of reproduction. Here, the plurality of cells may form an angle block.

FIG. 7 illustrates the structure of an angle block. Referring to FIG. 7, the angle block is constructed such that a plurality of cells are arranged in parallel so that only one of these cells can be reproduced. The cells that form the angle block, have the same reproduction time. Each of the cells corresponds to a specific angle. If the cells, which are units of reproduction, form an angle block, data for a specific angle is divided into interleaved units (ILVUs) and recorded on VOBs, which are units of record, and cells, which are units of record, using the interleaving method.

FIG. 8 illustrates the structure of a VOB and cells that are units of record when multi-angle support is not applied. Referring to FIG. 8, VOBs are sequentially stored and recorded in contiguous blocks of an information storage medium, the contiguous block being a contiguous recording space. However, as shown in FIG. 9, when multi-angle support is applied, VOBs for each angle and their cells are recorded in ILVUs on an interleaved block, using the interleaving method. As a result, data for a specific angle is not recorded on contiguous record areas. That is, angle data is sequentially, alternatively recorded using the interleaving method.

FIG. 9 illustrates angle data of two that is sequentially and alternately recorded using the interleaving method. Referring to FIG. 9, respective ILVUs have the same reproduction time. The amount of data to be recorded may vary according to the type of a compression method used. In the case of interleaved data, in order to reproduce data for an angle or reproduce data for a changed angle, a jump must be made to desired ILVUs. For instance, in order to reproduce data in a first angle, the data for the first angle in the ILVU must be detected. For this end, a video object bit stream contains data NXT ILVU_SA and NXT ILVU_SZ in the structure shown in FIG. 11, that indicate the position and size of the next ILVU data belonging to a bit stream. After reproduction of the ILVU data, a jump to the next ILVU data is made using the data NXT ILVU_SA and NXT ILVU_SZ. In order to change angles during the data reproduction, a jump must be made to the position of data for the changed angle. The extent of jumping is determined in ILVUs.

FIG. 10 illustrates jumping to data for a selected angle in view of cells. Referring to FIG. 10, even if a user issues a command to change angles at a certain time during reproduction of ILVU data, the subsequent image data can be reproduced without pause for a seamless change. This is accomplished by first completing the reproduction of ILVU data, following a link by jumping to ILVU data for the changed angle, and reproducing the ILVU data for the changed angle. Information regarding the position of ILVU data is multiplexed and contained in a bit stream of video object data that is recorded using the interleaving method.

FIG. 12 illustrates the structure of information SML_A-GL_Cn_DSTA contained in a video object bit stream specifying the positions and sizes of ILVU data for nine angles (n is a natural number between 1 and 9). The maximum number of angles supported by a DVD is nine. The data SML_A-GL_Cn_DSTA provides information regarding the ILVU data for angle #n through a link in the current ILVU data. After the reproduction of the current ILVU data, it is possible to change a current angle to a desired angle and reproduce data for the desired angle, using the data SML_AGL_Cn_DSTA.

In a DVD authoring process for multi-angle data support, images photographed at different angles are compressed to form several bit streams of data with the same reproduction length. Next, a bit stream is formed using the interleaving method and information is inserted into each bit stream, which allows a reference to other angles during data reproduction. Accordingly, video object data is recorded on a DVD such that angles can be changed during data reproduction.

However, if multi-angle data is divided into units and stored in a DVD using the interleaving method, the multi-angle data is not continuously recorded in contiguous areas of the DVD. Thus, for continuous reproduction of data for an angle, a reproducing apparatus is required to move its position many times to read the data. In particular, if a reproducing apparatus reproduces data from an optical disc or a hard disc, considerable time is spent by the apparatus to change its position. There is also a bit rate limit imposed on a compressed bit stream to compensate for the time delay offset caused when the apparatus changes its position.

SUMMARY OF THE INVENTION

The present invention provides an information storage medium with a data structure in which random access can be performed regardless of the position of multi-angle data, and an apparatus therefor.

Additional aspects and/or advantages of the invention will be set forth in part in the description which follows and, in part, will be obvious from the description, or may be learned by practice of the invention.

According to an aspect of the present invention, there is provided an information storage medium on which multi-angle data is recorded, including at least two clips in each of which video object data for an angle of the multi-angle data is recorded. The at least two clips are recorded in contiguous areas of the information storage medium.

The video object data for each angle may include: a plurality of jumping points that are access points enabling video object data of different angles to be reproduced without pause; and additional information that contains jumping point information.

The video object data may include clip information including additional information regarding the clip, and the jumping point information.

The jumping point information may include a starting point to each jumping point of the clip and may be stored in a table format in the clip information.

The clip information may include entry point information that specifies points that are randomly accessible, and the jumping point information is added to the entry point information and specifies whether each entry point can act as a jumping point.

The clip information may include a jumping point map including information regarding jumping points through which a clip is virtually connectable to clips of different angles.

The positions of the jumping points and a distance between adjacent jumping points may be determined so that clips are reproducible without pause when jumping between clips during clip reproduction.

The information storage medium may further include a plurality of PlayLists each of which is linked to one or more PlayItems which form an angle block, and each PlayItem may be a portion of a clip and indicating starting and finishing times of the clip.

Each of the plurality of PlayItems may correspond to an angle of the multi-angle data.

Each PlayList may include additional information regarding an angle and each PlayList may be information for a different angle of the multi-angle data.

According to another aspect of the present invention, there is provided a reproducing apparatus which reproduces data recorded on an information storage medium in which video object data is recorded in units of clips separately recorded in contiguous areas of the information recording medium and containing information regarding video object data corresponding to respective angles of multi-angle data, including: a detector which detects related clips; and a reader which reads and reproduces detected clips in contiguous areas of the information storage medium when reproducing multi-angle data.

The video object data for an angle may include a plurality of jumping points for enabling video object data for different angles to be reproduced without pause, the jumping point information may be recorded as additional information on the information storage medium, the two jumping points may indicate positions of clips in a same reproduction time zone, and the apparatus may jump from a clip for an angle to a clip for another angle from a jumping point when a change of angles is required during clip reproduction, in order to reproduce multi-angle data.

The respective video object data may include clip information which provides additional information regarding the clips and includes jumping point information which the detector detects.

The apparatus may include: a jumping point estimator which estimates where jumping points of clips, the information of which is recorded at the same point of the table, are connected to one another; and a connected jumping point detector which detects connected jumping points of a clip, which is being reproduced, and a clip for a changed angle. The apparatus may reproduce the clips at the detected jumping points when changing angles during reproduction of the clip. The jumping point information may include the information from a starting point to each jumping point and is stored in a table format in the clip information. The estimator may estimate the jumping points of the clips, and the connected jumping point detector may detect connected jumping points of a clip, which is presently being reproduced, and a clip for a changed angle and reproduces the clips at the detected jumping points, when changing angles during reproduction of the clip.

The apparatus may include: a jumping point estimator which estimates where the jumping points of the clips, the information of which is recorded at the same position as the entry point information, are connected to one another; and a jumping point detector which detects the connected jumping points. The reader may reproduce clips at the detected jumping points when angles are changed. The clip information may include entry point information that can be randomly accessed, and the jumping point information may be added to the entry point information in order to specify whether a related entry point acts as a jumping point. The jumping point estimator may estimate that the jumping points of the clips, the information of which is recorded at the same position as the entry point information, are connected to one another, the jumping point detector may detect the connected jumping points, and the reader may reproduce clips at the detected jumping points when angles are changed.

The video object data may include jumping point information as a plurality of clips for angles, and jumping point position information of each clip may be sequentially contained in a table format in the common jumping point information.

The positions of the respective jumping points and the distance between adjacent jumping points may be determined so that clips are reproducible without pause when jumping between clips during clip reproduction.

The multi-angle data may include a plurality of PlayLists each of which is linked to one or more PlayItems which form an angle block, and each PlayItem may be a portion of a clip and indicating starting and finishing times of the clip.

The multi-angle data may include information regarding PlayItems and PlayLists and may be recorded as information regarding units of reproduction, each PlayItem may indicate the clip or a portion thereof, the respective PlayLists may be recorded to correspond to the respective angles, the respective PlayItems may correspond to the respective clips, and the respective PlayLists may have a plurality of PlayItems.

Each PlayList may include information regarding a corresponding angle, and the reader may reproduce a PlayList corresponding to a related angle.

According to yet another aspect of the present invention, there is provided a recording apparatus for recording multi-angle data on an information storage medium in which random access can be performed, including: a recorder which records video object data for each angle of multi-angle data in units of clips in contiguous areas of the information storage medium using a non-interleaving method; and a divider which divides the video object data into units of clips.

The apparatus may include a jumping point creator which creates a plurality of jumping points in addition to the video object data for the respective angles, and the recorder may record information regarding the plurality of jumping points as additional information.

The apparatus may include a clip information creator which creates clip information for the clips in addition to the video object data, the clips being units of record, and the clip information may include jumping point information.

The jumping point information may include information from a starting point to jumping point of each clip and may be stored as a table in the clip information.

The clip information may include entry point information regarding points that are randomly accessible. The jumping point information may be added to the entry point information to indicate whether respective entry points act as jumping points.

The jumping point information may be clips for multi-angle data and may be stored as a table that sequentially specifies the position of the jumping points of each clip.

The jumping point creator may determine the positions of the jumping points and the distance between adjacent jumping points such that the clips are reproduced without pause when changing the position of reproduction at a jumping point for the change of angles during reproduction of a clip.

The recorder may record a plurality of PlayLists each of which is linked to one or more PlayItems which form an angle block, and each PlayItem may be a portion of a clip and may indicate starting and finishing times of the clip.

The recorder may record information regarding PlayItems and PlayLists, each of the PlayItems may correspond to a respective clip and the respective PlayLists may have a plurality of PlayItems.

The apparatus may include an information adder which adds additional information regarding a certain angle to the respective PlayLists that are recorded to correspond to the respective angles.

According to yet another aspect of the present invention, there is provided a method of recording multi-angle data on an information recording medium, including: dividing the multi-angle data into one or more clips for different angles of the multi-angle data; dividing each clip into jumping units the start of each of which being designated as a jumping point identifying an interface between clips; and recording the clips in contiguous areas of the information storage medium.

According to yet another aspect of the present invention, there is provided a method of reproducing multi-angle data from an information recording medium, including: reproducing a first clip including video object data for an angle of the multi-angle data; and jumping from a jumping point of the first clip to a jumping point of second clip including video object data for another angle of the multi-angle data so as to change angles. The first and second clips are divided into jumping units, the start of each jumping unit being designated as jumping points identifying an interface between the clips. The clips are recorded in contiguous areas of the information storage medium.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 10 illustrates jumping to data for a selected angle in view of cells;

FIG. 11 illustrates the structure of information contained in a video object bit stream having interleaved units (ILVU) data for angle #1;

FIG. 12 illustrates a structure of information contained in a video object bit stream for a plurality of angles;

DETAILED DESCRIPTION OF THE PREFERRED EMBODIMENTS

Figure 1:
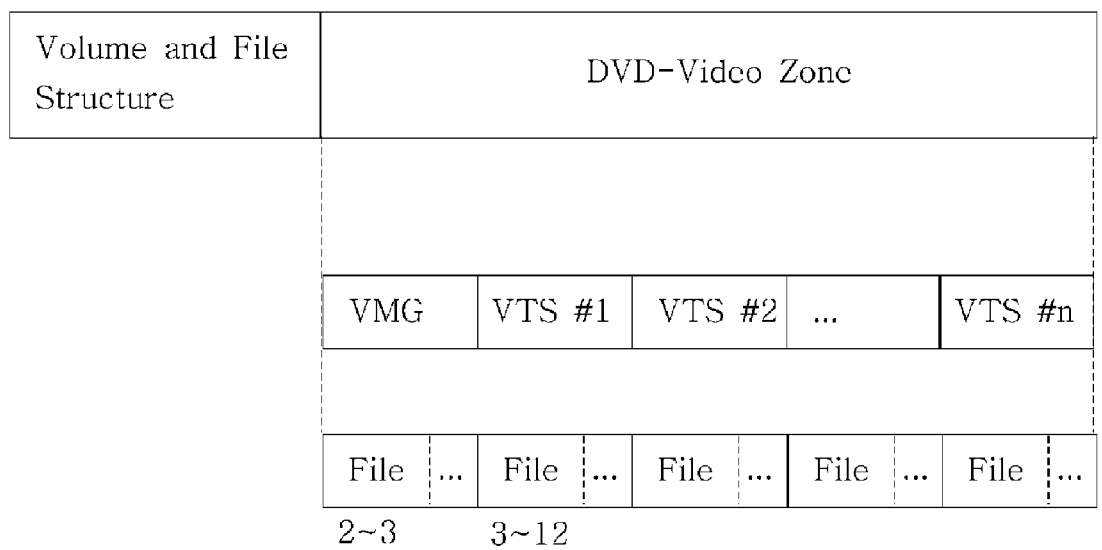
FIG. 1 illustrates the data structure of a DVD.
Figure 2:
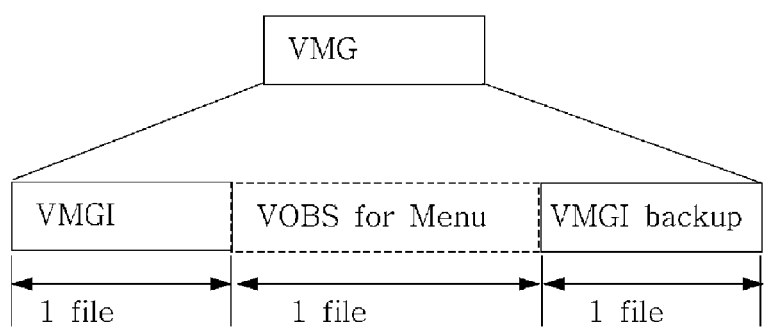
FIG. 2 illustrates the data structure of a VMG area.
Figure 3:
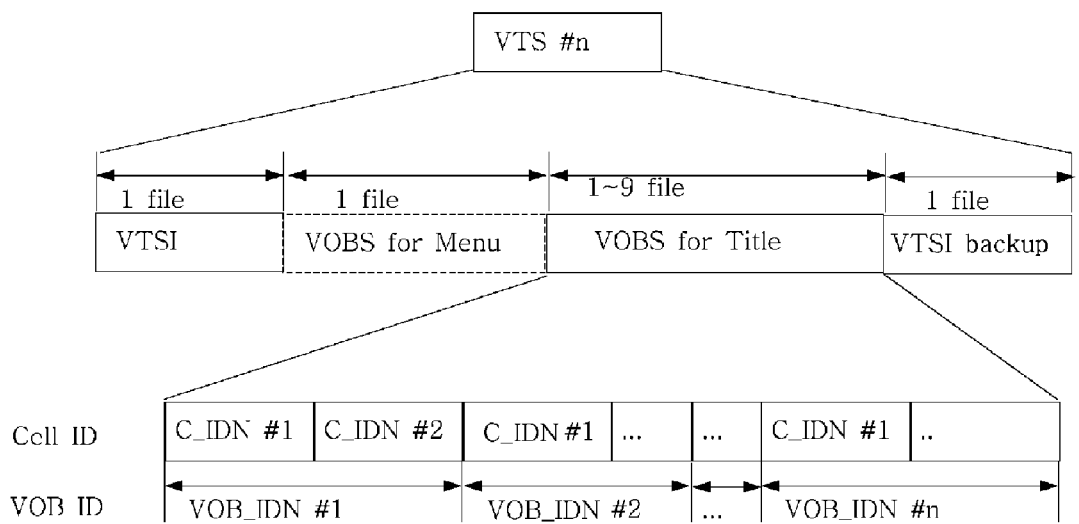
FIG. 3 illustrates the data structure of a VTS area.
Figure 4:
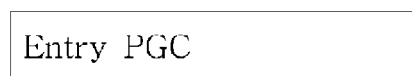
FIG. 4 illustrates an example of a title linked to a PGC, i.e., an entry PGC.
Figure 5:
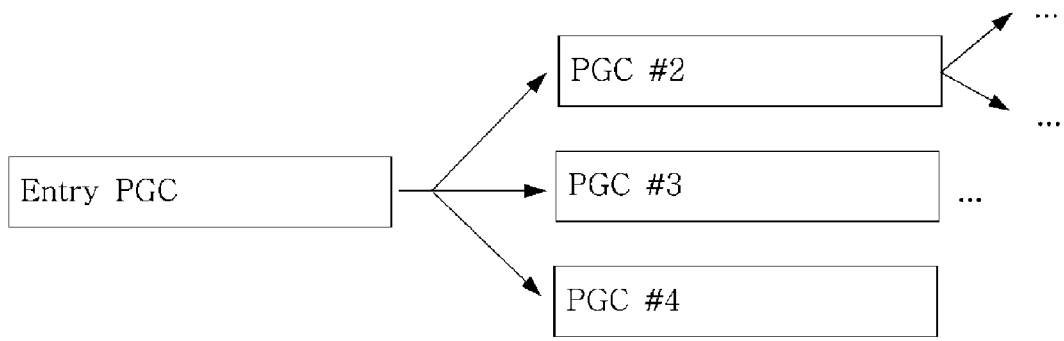
FIG. 5 illustrates an example of a title including a plurality of linked PGCs.
Figure 6:
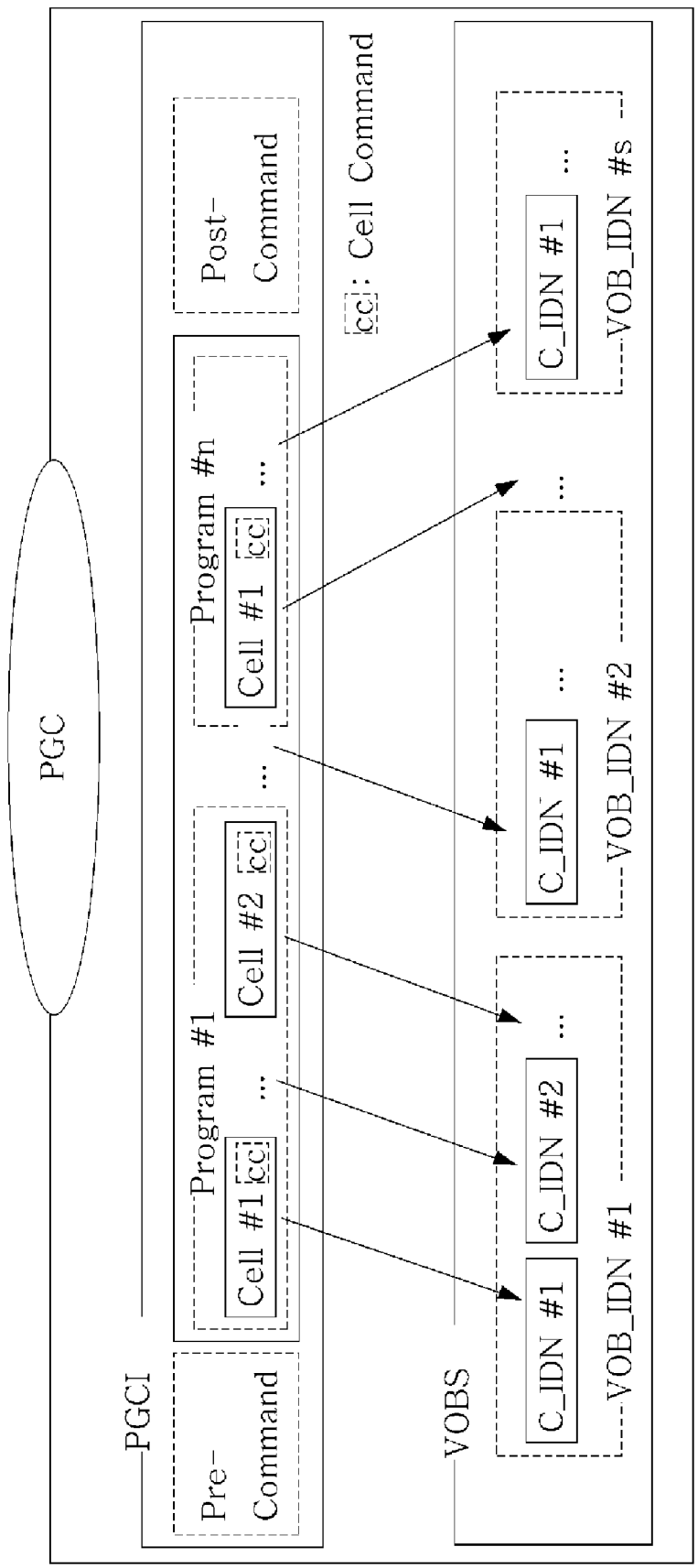
FIG. 6 illustrates the data structure of a PGC.
Figure 7:
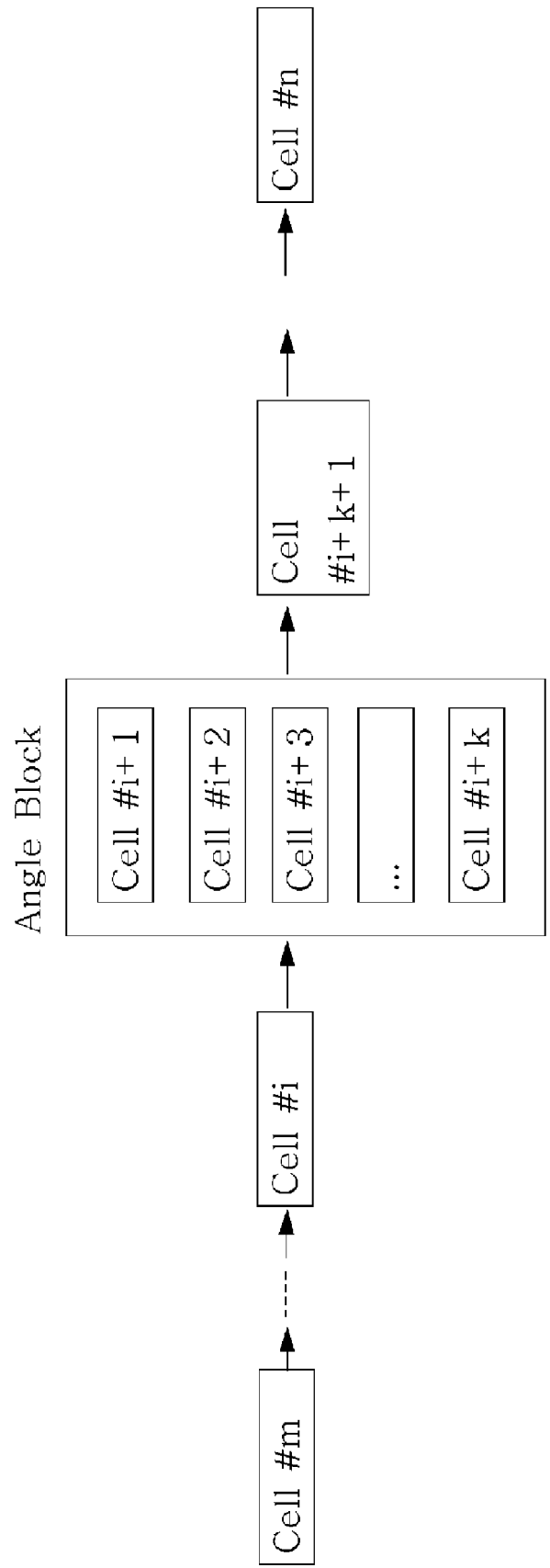
FIG. 7 illustrates the structure of an angle block.
Figure 8:
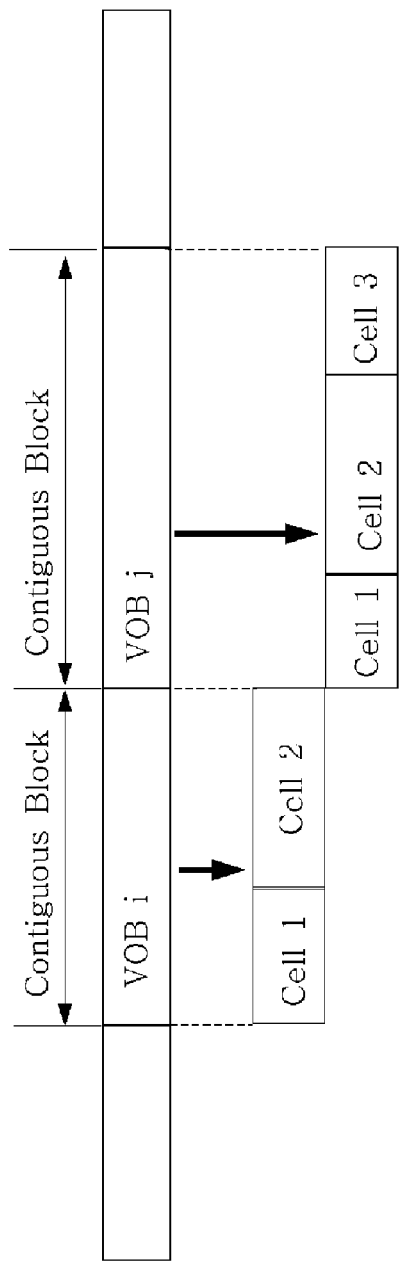
FIG. 8 illustrates the structure of VOBs and cells that are units of record when multi-angle viewing is not applied.
Figure 9:
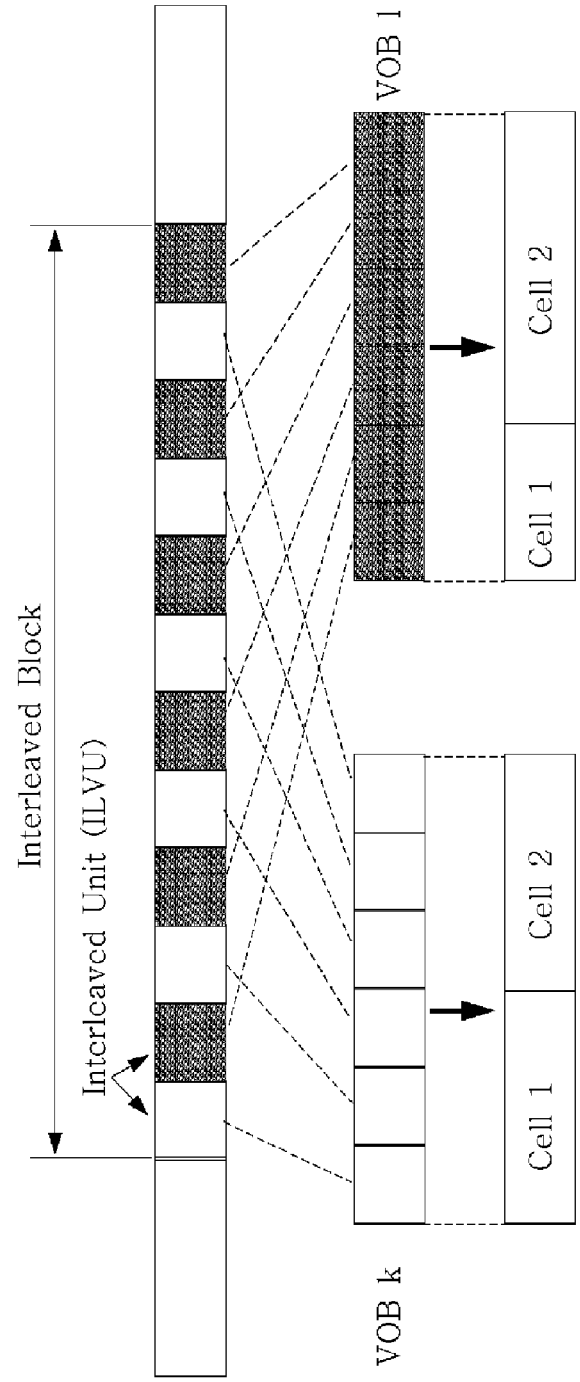
FIG. 9 illustrates angle data that is alternately recorded using an interleaving method.

Reference will now be made in detail to embodiments of the present invention, examples of which are illustrated in the accompanying drawings, wherein like reference numerals refer to the like elements throughout. The embodiments are described below to explain the present invention by referring to the figures.

According to an embodiment of the present invention, multi-angle support is enabled such that angle data is recorded on an information storage medium using a separation recording method, not an interleaving method. In other words, multi-angle support is realized by recording bit streams for the respective angle data in contiguous record areas of an information storage medium. During data reproduction, angle change is accomplished by dividing data for each angle into jumping units (JPUs), designating a start address of the JPUs as a jumping point, and recording information regarding jumping points of the respective angle data as additional information.

Elements of information recorded on a recording medium according to an embodiment of the present invention include:
(a) compressed and coded audio/video (AV) streams with respect to respective angles;
(b) clip information files containing information, e.g., attribute information, regarding a coded audio/video (AV) stream;
(c) PlayItems that indicate reproduction time for a reproduction section between times IN_time and OUT time of a clip including elements (a) and (b);
(d) PlayList including at least one PlayItem; and
(e) jumping point map in which the positions of jumping points are recorded in a table format.

Multi-angle data is video object data including a plurality of reproduction units corresponding to a certain reproduction time. That is, multi-angle data includes of data photographed by several cameras at different angles. In general, audio data is created to be the same angle at different angles but can be differently created at different angles. In conclusion, video object data that can be reproduced in the same time zone is called multi-angle data, and content that can be reproduced in the same time zone is called multi-angle content.

In general, video object data is massive and thus stored or transmitted as compressed bit streams. The present invention uses a clip, which is a unit of record, and a PlayList and a PlayItem, which are units of reproduction. The clip corresponds to a cell, the unit of record in a DVD, and the PlayList and PlayItem correspond respectively to a program and a cell, which are units of reproduction in a DVD.

That is, an AV stream is recorded in units of clips in an information storage unit according to an embodiment of the present invention. In general, a clip is recorded in contiguous areas of an information storage medium. An AV stream is also compressed and recorded to reduce the size of the AV stream. When reproducing a recorded clip, characteristics of the clip information, which is recorded in each clip, is required to interpret the compressed video object data. The clip information contains the audio and video attributes of each clip, and an entry point map with information regarding the position of entry points that can be randomly accessed. In the case of the motion picture expert groups (MPEG) video compression technique, an entry point is positioned at an I picture that is intracoded. The entry point map is mainly used during a time search of detecting the position of data a time after data reproduction.

Figure 13:
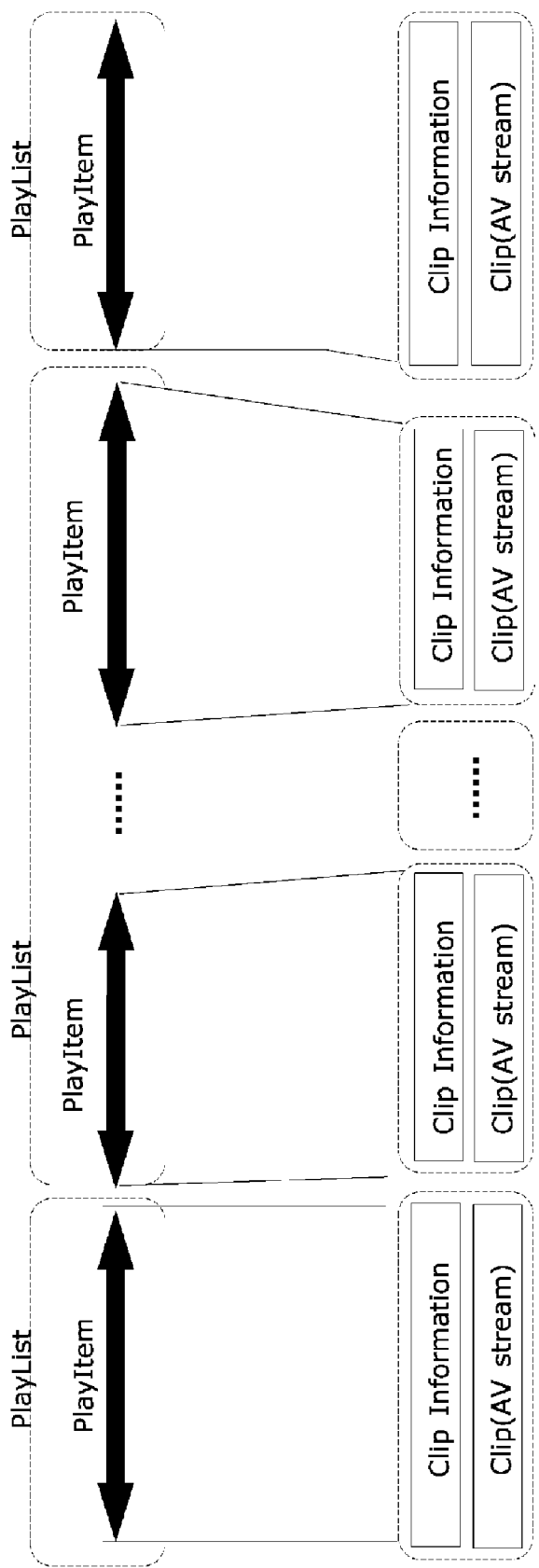
FIG. 13 illustrates the relationship among a PlayList, a PlayItem, clip information, and a clip.

FIG. 13 illustrates the relationship among a PlayList, a PlayItem, clip information, and a clip. Referring to FIG. 13, the PlayList is a basic unit of reproduction. In an information storage medium according to an embodiment of the present invention, a plurality of PlayLists are stored. A PlayList is linked to a plurality of PlayItems. Each PlayItem is a portion of a clip, and more particularly, indicates starting and finishing times of reproduction in a clip. Thus, clip information is used to easily detect a desired portion of a clip.

Hereinafter, a data structure and record position of multi-angle data will be described with reference to the accompanying drawings.

Figure 14:
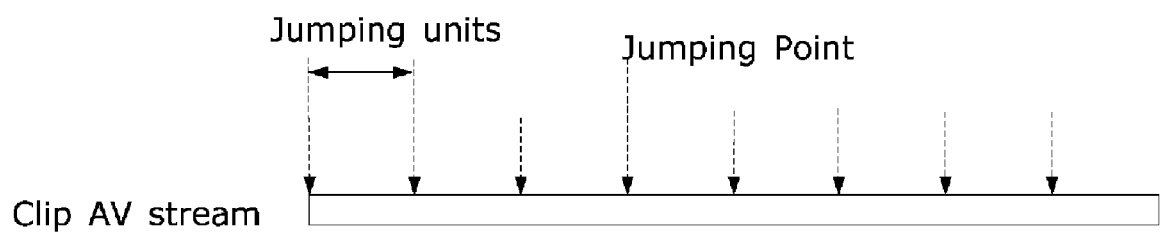
FIG. 14 illustrates the relationship between jumping units and jumping points in an audio/video (AV) stream clip.

FIG. 14 illustrates the relationship between a jumping unit and a jumping point in a clip AV stream. Referring to FIG. 14, if a clip represents video object data at a specific angle and a part multi-angle data, the clip is divided into a plurality of jumping units and the starting point of each jumping unit is called a jumping point. The jumping point denotes a point of a certain clip for an angle, the point being a starting or destination point when jumping in from or out to a clip for a different angle during reproduction of the certain clip, respectively. A jumping point may be an entry point. However, for seamless data reproduction, all entry points are not set as jumping points because an entry point is formed at intervals of about 0.5 seconds.

Figure 15:
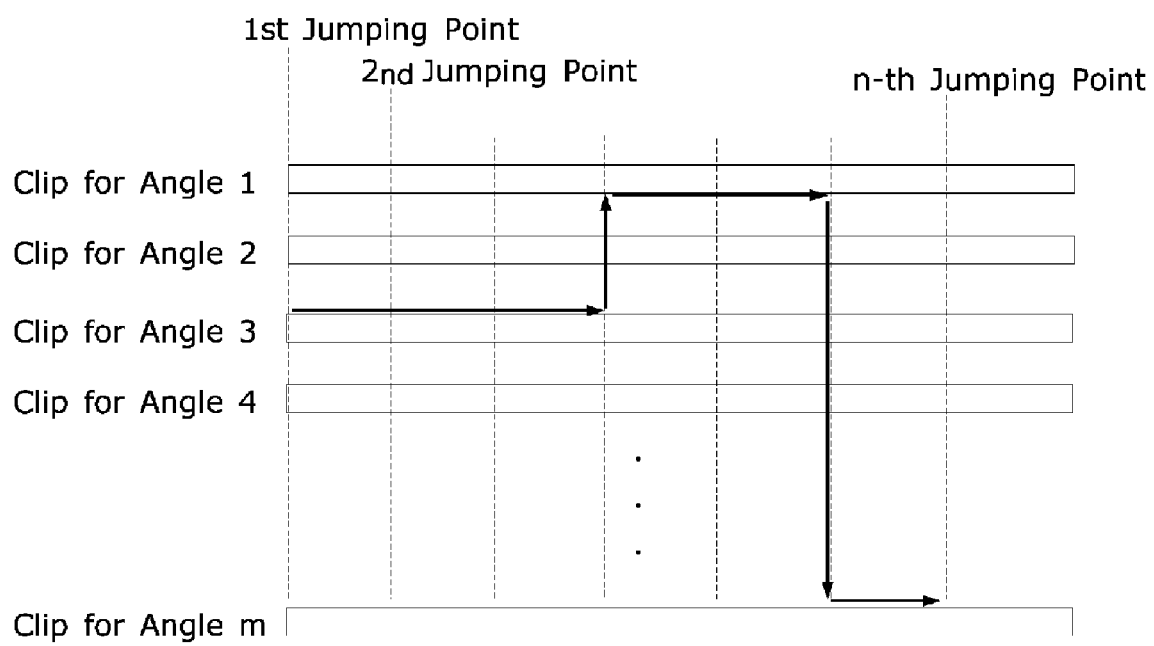
FIG. 15 illustrates a plurality of clips for multi-angle data.

FIG. 15 illustrates a plurality of clips for multi-angle data. As shown in FIG. 15, assuming that a plurality of clips with an equivalent number of jumping points are linked to one another, the respective clips are recorded in different areas and are linked to one another through jumping points of the same reproduction time. In order to reproduce a different clip during reproduction of a clip after the reproduction of the clip to a jumping point is complete and detecting a jumping unit of the different clip, which corresponds to the jumping unit, reproducing from the corresponding jumping unit, thereby enabling seamless, continuous reproduction of clips. In FIG. 15, arrows denote a process in which the clip for a third angle is first partially reproduced, a first angle is selected during the reproduction of the clip for the third angle, a clip for the first angle is reproduced, an $m^{th}$ angle is selected during the reproduction of the clip for the first angle, and a clip for the $m^{th}$ angle is reproduced. When a user inputs a command to change angles, the changing is performed in units of jumping units.

According to an embodiment of the present invention, it is possible to continuously reproduce data from an information storage medium while changing the position of a reproducing apparatus within a time even when the data is recorded in non-continuous different areas of the information storage medium in which random access can be carried out. In the present invention, the changing of position is described as jumping. In general, additional time is not required for jumping in an electronic information storage medium such as memory. However, in the case of an information storage medium such as an optical disc where data is read by moving a pickup, additional time is required for jumping. Also, when the speed of reading video object data from an information storage medium is different from the speed of reproducing the read video object data, the information storage medium requires an apparatus that can compensate for the difference between reading and reproducing speeds, even when data recorded in contiguous areas is to be read and reproduced. According to an embodiment of the present invention, a video object buffer is used as the apparatus providing compensation for the difference. Data read from an information storage medium at a speed is stored in a video object buffer and then the data is reproduced from the buffer. During the data reading, controlling the speed of the data reading is important in order to prevent overflow or underflow of the video object buffer. The use of the video object buffer enables seamless reproduction of the data even if video object data is recorded at a variable bit rate (VBR).

Figure 16:
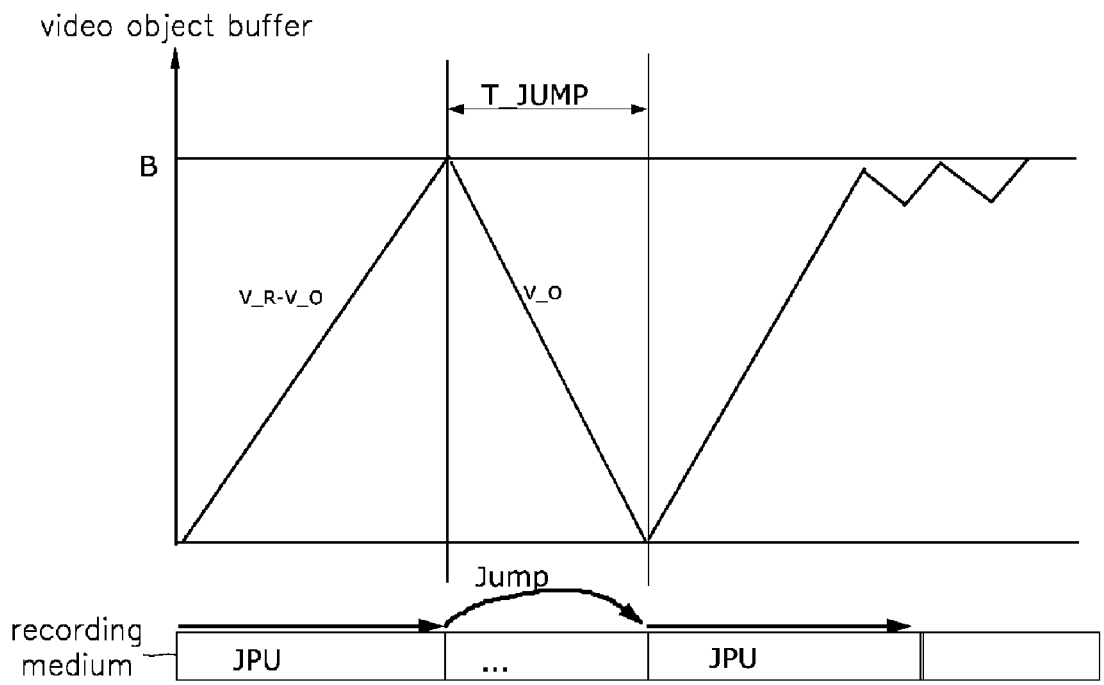
FIG. 16 illustrates the relationship between jumping and a buffer which enables video object data to be reproduced without pause.

As shown in FIG. 16, the size of each jumping unit is determined within a range that allows the video object data stored in the video object buffer to be reproduced seamlessly when jumping to a clip of video object data for a different angle and reproduction of the next jumping unit for the different angle starts prior to the occurrence of buffer underflow. In the case of a reproducing apparatus that requires additional time for jumping to a jumping point for a different angle, the size of the jumping unit is determined by the following condition, assuming that the longest jump time is T_JUMP, the speed of reading data is V_R, and the speed of reproducing video object data is V_O:

$$\text{Jumping Unit Size} > V\_R * V\_O * T\_JUMP/(V\_R - V\_O). \quad (1)$$

Also, the size of a video object buffer must meet the following condition:

$$\text{Buffer Size}(B) > V\_O * T\_JUMP. \quad (2)$$

Figure 17:
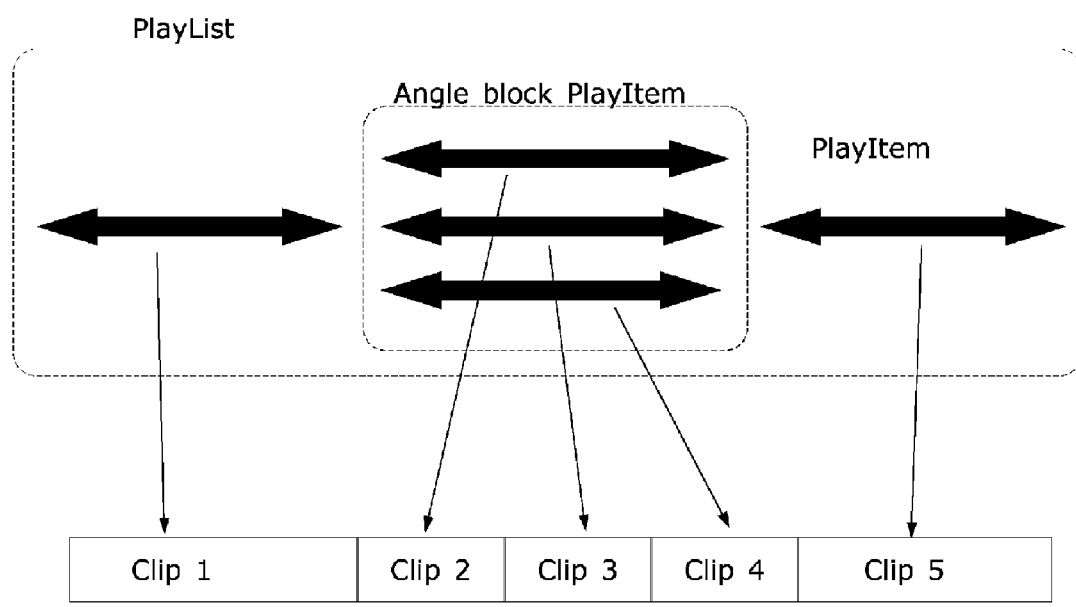
FIG. 17 illustrates a PlayList with a multi-angle structure.

FIG. 17 illustrates a PlayList with a multi-angle structure according to an embodiment of the present invention. The PlayList of FIG. 17 includes a plurality of PlayItems with a sequential structure and an angle block PlayItem with a multi-angle structure. The angle block PlayItem includes of a plurality of PlayItems. In the case of the angle block PlayItem, only one PlayItem thereof is reproduced when reproducing the PlayList. Also, during the reproduction of the PlayItem, angle change is possible by selecting the PlayItem of the changed angle from the angle block PlayItem, and reproducing the selected PlayItem. In general, PlayItems, which constitute an angle block, have the same length of reproduction time. According to an embodiment of the present invention, clips 2 through 4 designated by the respective PlayItems of the angle block are not interleaved but are recorded in contiguous areas. In other words, clips 2 through 4 are respectively recorded in the areas, in the same manner as clips designated by PlayItems, not belonging to an angle block. However, clips 2 through 4 are characterized by the jumping point information.

Hereinafter, three types of jumping point data structures will be described with reference to the accompanying drawings.

Figure 18:
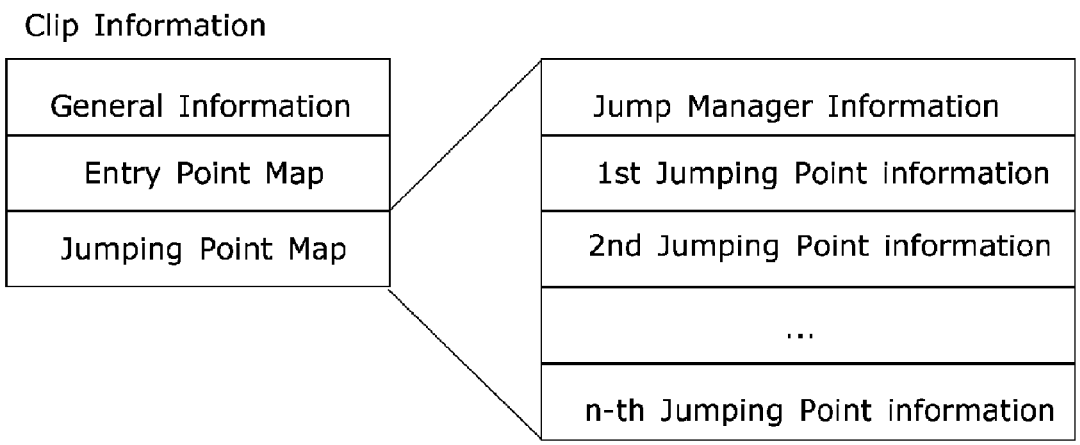
FIG. 18 illustrates the data structure of jumping points according to a first embodiment of the present invention.

FIG. 18 illustrates the jumping point data structure of a clip for an angle, according to a first embodiment of the present invention. Referring to FIG. 18, clip information further includes a jumping point map, in addition to the general information and entry point map of the related art. Jump point information contained in the jumping point map is closely related to video object data. Therefore, the jump point information is included in clip information data and provides additional information regarding the clip.

The general information contains the following information:

version_number: version of a clip information file.

EPMap_start_address: starting address of the entry point map, indicated by a byte number from the leading byte of the clip information file.

JPMap_start_address: starting address of the jumping point map, which is indicated by a byte number from the leading byte of the clip information file. If the value of JPMap_start_address is 0, it means that the clip related to the clip information file is not for an angle and the clip does not contain information regarding the jumping point map.

ClipInfo: attributes of an AV stream file related to the clip information file.

The entry point map contains information regarding the time and position of an entry point that is randomly accessible. The jumping point map contains information regarding jumping points through which a clip can be virtually connected to clips of different angles. According to an embodiment of the present invention, jump manager information included in the jumping point map indicates the number of jumping points, and the number of jumping point information entries following the jump manager information. The jumping point information is used to detect the positions of the respective jumping points, the starting positions of the related clips. The jumping point information is expressible as bytes or as a number of sectors. Also, if the video object data is coded as an MPEG transport stream, the respective jumping point information is expressible as a number of MPEG-TS packets.

Figure 19:
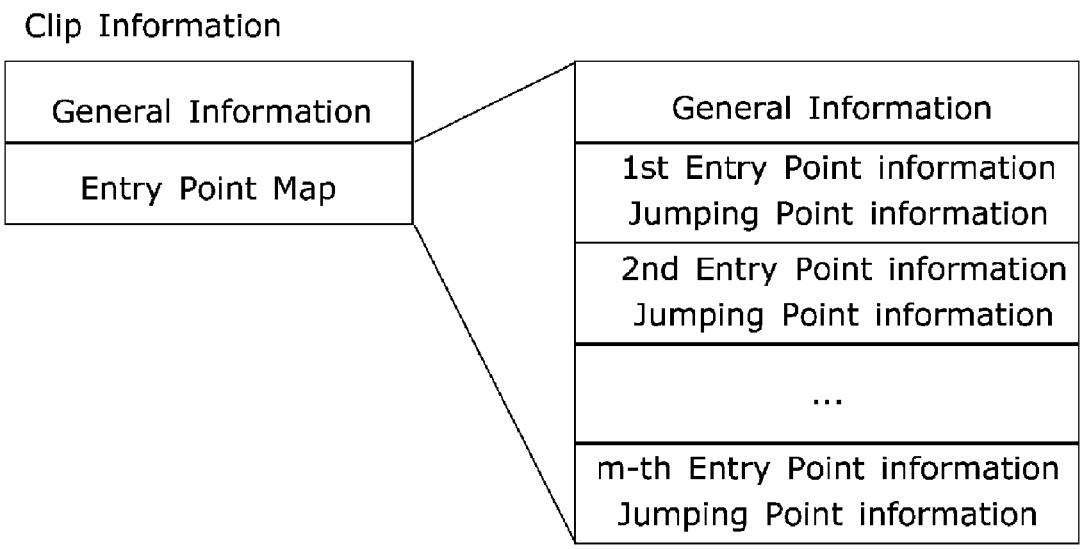
FIG. 19 illustrates the data structure of jumping points according to a second embodiment of the present invention.

FIG. 19 illustrates the data structure of jumping points according to a second embodiment of the present invention. The data structure of jumping points of FIG. 19 illustrates an entry point map containing jumping point information. Therefore, the data structure of FIG. 19 is advantageous in that it does not require any additional space to store the jumping point information. As mentioned above, when video object data is coded using time-space compression such as MPEG, a jumping point should be set to an entry point which is a random access entry point. By incorporating information into the entry point map as to whether an entry point acts as a jumping point, the jumping information is easily recorded.

Figure 20:
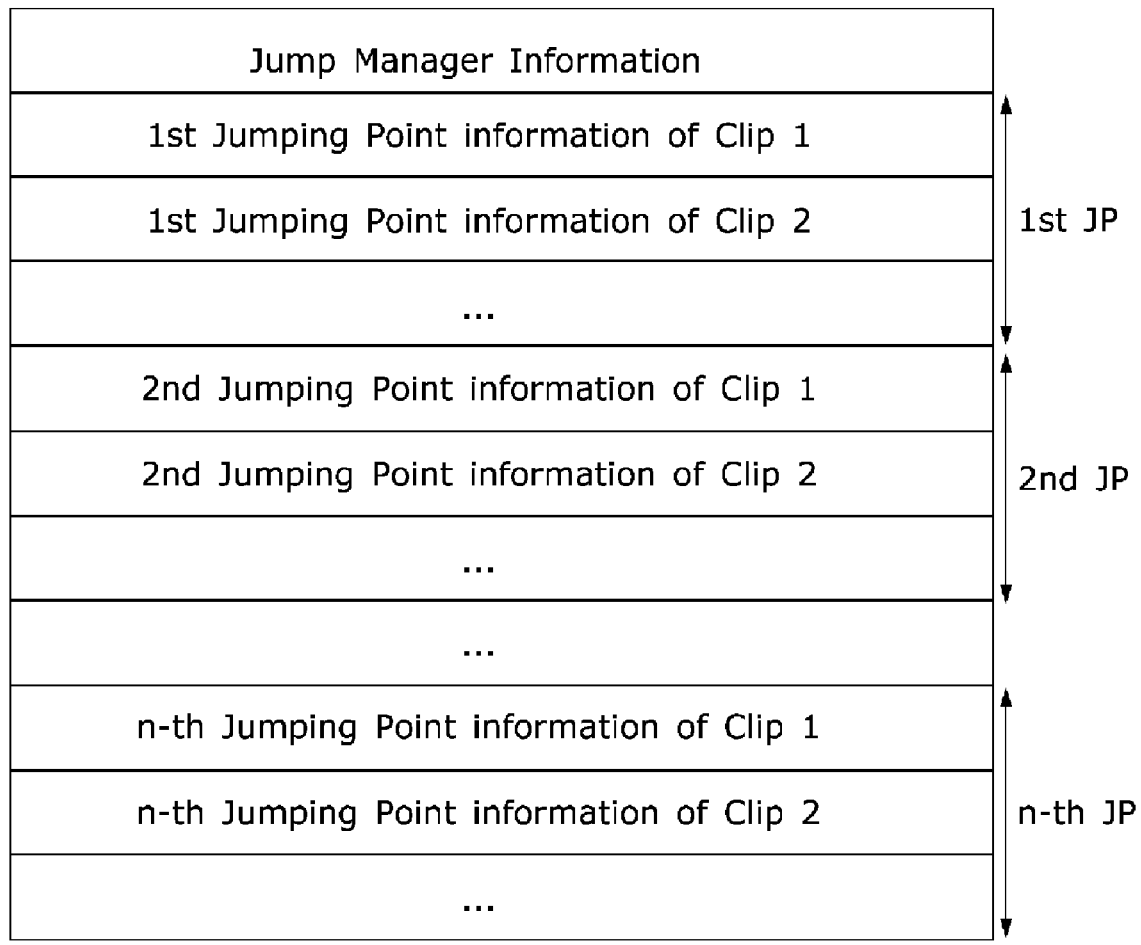
FIG. 20 illustrates the data structure of jumping points according to a third embodiment of the present invention.

FIG. 20 illustrates the data structure of jumping points according to a third embodiment of the present invention. FIG. 20 is a diagram of a jumping point map information structure, which includes the jumping point information of clips that form an angle block. The jumping point map information structure is collected separately from the clip information structure. The jumping point map information includes jump manager information that indicates the number of clips which form the angle block and the number of jumping points present in a clip, and jumping point information for the respective clips that sequentially follows the jump manager information. The jumping point map information structure enables the position of a desired angle to be easily detected.

Figure 21:
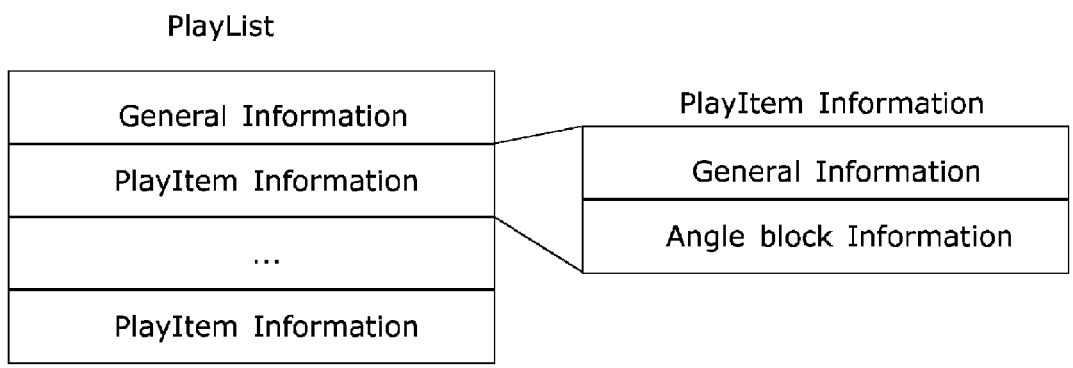
FIG. 21 illustrates an example of a PlayList with PlayItems that form an angle block.

FIG. 21 illustrates an example of a PlayList with PlayItems that form an angle block. Referring to FIG. 21, each PlayItem information contains general PlayItem information and angle block information. The angle block information basically specifies whether corresponding PlayItems forms an angle block. PlayItems forming an angle block must be sequentially recorded. During reproduction of the PlayList, at least one selected PlayItem, which form an angle block, is reproduced. During reproduction of the PlayItem forming angle block, another PlayItem forming the angle block may be reproduced.

Figure 22:
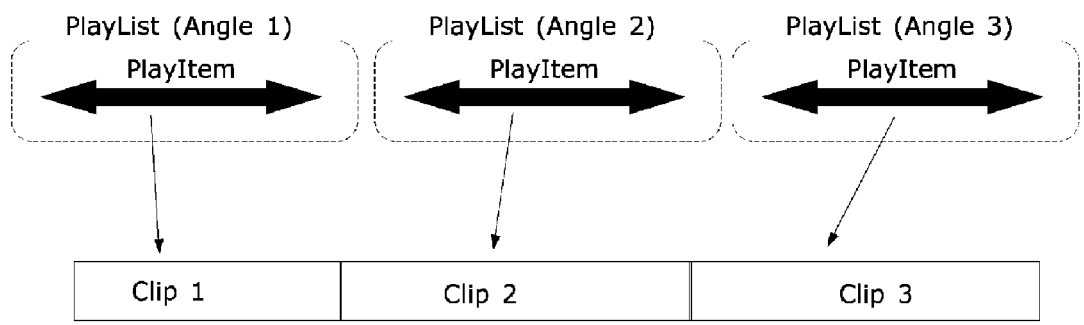
FIG. 22 illustrates an example of PlayLists for different angles.
Figure 23:
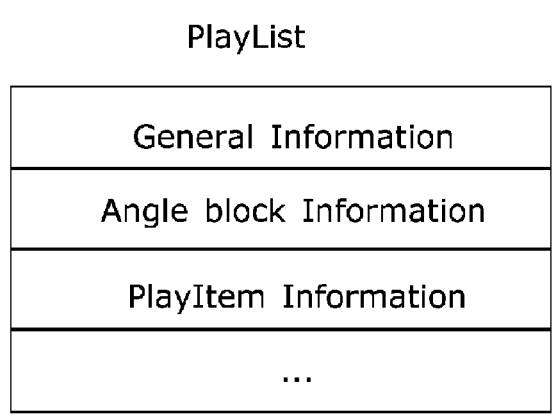
FIG. 23 illustrates the structure of information regarding an angle corresponding to a PlayList.

FIG. 22 illustrates an example of PlayLists, which are units of reproduction, for different angles. Referring to FIG. 22, the respective PlayLists include a single PlayItem, which does not form an angle block. That is, each PlayList corresponds to an angle. As shown in FIG. 23, each PlayList contains angle block information regarding an angle. When a user selects an angle or changes angles, a related PlayList is reproduced.

According to an embodiment of the present invention, multi-angle data, in units of record, are recorded in contiguous areas of an information storage medium. The interfaces to the units of record representing different angles are determined to be jumping points, and information regarding the jumping points is stored as additional information. Next, information regarding units of reproduction corresponding to the units of record is stored as multi-angle information.

A reproducing apparatus according to an embodiment of the present invention reproduces multi-angle data and has the following advantages:

First, if angles are changed, multi-angle data can be read from contiguous areas of an information storage medium and the data read can be reproduced. That is, multi-angle data is coded using the same method for coding non multi-angle data. Therefore, contrary to the interleaving method, additional data and coding operations are not required to contiguously reproduce data for an angle.

Secondly, a clip, which is a unit of record, contains jumping point information that enables connection to video object data for an angle block. To change angles at an instant when reproducing video object data for a current angle, the reproducing apparatus reproduces the video object data for the current angle to a next jumping point and then reproduces video object data for a changed angle from a jumping point corresponding to the next jumping point.

Thirdly, when multi-angle information is recorded in a plurality of PlayItems, i.e., units of reproduction, which form an angle block and belong to a PlayList (see FIG. 21), in order to change angles during reproduction of one PlayItem of the angle block, the reproducing apparatus reproduces PlayItem to a jumping point closest to a current reproducing position of a clip and then a clip for the changed angle from the jumping point. If a single PlayList is recorded for each angle as shown in FIG. 22, when a user wants to change angles during reproduction of a PlayList, a PlayList for a changed angle is detected and reproduced.

A recording apparatus according to an embodiment of the present invention records data such as clips, and information regarding jumping points and units of reproduction on an information storage medium.

A recording apparatus according to a preferred embodiment of the present invention determines the sizes of jumping units, based on a reading speed V_R of a reproducing apparatus, a jumping time T_JUMP, and the highest bit rate V_O of video object data. Next, the determined sizes of jumping units are converted into reproduction time. Next, the video object data is coded such that random access points are set to be larger than or the same as the reproduction time. Here, the interfaces of the video object data are jumping points. In general, a random access point is the starting point of a group of pictures (GOPs) in time-space compression coding such as MPEG. Thus, each jumping unit is comprised of a plurality of GOPs. Also, jumping points should be formed in the same reproduction time zone of each video object data.

For the respective angles, the coded video object data is recorded in contiguous areas of an information storage medium. Information regarding the locations of the jumping points are recorded as additional information. According to an embodiment of the present invention, information regarding jumping points of each clip may be recorded as clip information.

Next, information regarding units of reproduction, which form multi-angle data, is created and recorded. For instance, PlayItems corresponding to respective clips form a multi-angle and a PlayList is made by linking the PlayItems to one another. Otherwise, a single PlayList may correspond to a single angle.

As described above, according to an embodiment of the present invention, video object data for multi-angle data is divided into units and recorded in contiguous areas of an information storage medium without using the interleaving method. Accordingly, the layout of a data area is easy to control and random access is easy to perform, thereby effectively reading multi-angle data.

Although a few embodiments of the present invention have been shown and described, the present invention is not limited to the disclosed embodiments. Rather, it would be appreciated by those skilled in the art that changes may be made in this embodiment without departing from the principles and spirit of the invention, the scope of which is defined in the claims and their equivalents.

What is claimed is:

1. A method of recording motion picture data for different angles corresponding to a motion picture to an information storage medium, the method comprising:
   recording clip information on the information storage medium; and
   recording clip audio-video (AV) streams corresponding to the recorded clip information on the information storage medium, at least two of the recorded clip AV streams correspond to the motion picture data for different angles, and each of the at least two clip AV streams comprising a plurality of interleaved blocks, and the interleaved blocks included in one clip AV stream among the at least two clip AV streams are interleaved with the interleaved blocks included in the other clip AV streams among the at least two clip AV streams,
   wherein:
      each recorded clip information comprises an entry point map comprising:
         information on entry points of a corresponding one of the recorded clip audio-video streams for random access, and
         information on whether each of the entry points is an angle change point,
      the angle change point is a point through which the motion picture is reproduced from one of the angles to another of the angles,
      the clip information further comprises information on an address of the entry point map, and a start point of the interleaved blocks is the angle change point.

2. The method of claim 1, wherein the information on the entry points comprises location information of the entry points among the AV streams.

3. The method of claim 1, wherein the information storage medium further comprises playlist information which comprises at least one playitem corresponding to the recorded clip AV streams.

4. The method of claim 3, wherein the at least one playitem comprises angle block information, and the angle block information comprises information on whether the playitem is for the motion picture data of the different angles.

5. The method of claim 4, wherein the angle block information further comprises information on a number of the different angles of the motion picture data of the different angles.

6. A method of reproducing motion picture data for different angles corresponding to a motion picture from an information storage medium, the method comprising:
   reading clip information from the information storage medium; and
   reading clip audio-video (AV) streams corresponding to the read clip information from the information storage medium, at least two of the read clip AV streams correspond to the motion picture data for different angles, and each of the at least two clip AV streams comprising a plurality of interleaved blocks, and the interleaved blocks included in one clip AV stream among the at least two clip AV streams are interleaved with the interleaved blocks included in the other clip AV streams among the at least two clip AV streams, wherein:
   each read clip information comprises an entry point map comprising:
      information on entry points of a corresponding one of the read clip audio-video streams for random access, and
      information on whether each of the entry points is an angle change point, and
   the angle change point is a point through which the motion picture is reproduced from one of the angles to another of the angles,
   the clip information further comprises information on an address of the entry point map, and
   a start point of the interleaved blocks is the angle change point.

7. The method of claim 6, wherein the information on the entry points comprises location information of the entry points among the AV streams.

8. The method of claim 6, wherein the information storage medium further comprises playlist information which comprises at least one playitem corresponding to the read clip AV streams.

9. The method of claim 8, wherein the at least one playitem comprises angle block information, and the angle block information comprises information on whether the playitem is for the motion picture data of the different angles.

10. The method of claim 9, wherein the angle block information further comprises information on a number of the different angles of the motion picture data of the different angles.

* * * * *